J. A. STEINMETZ.
BEER COOLER.
APPLICATION FILED JULY 8, 1916.
1,244,140.
Patented Oct. 23, 1917.
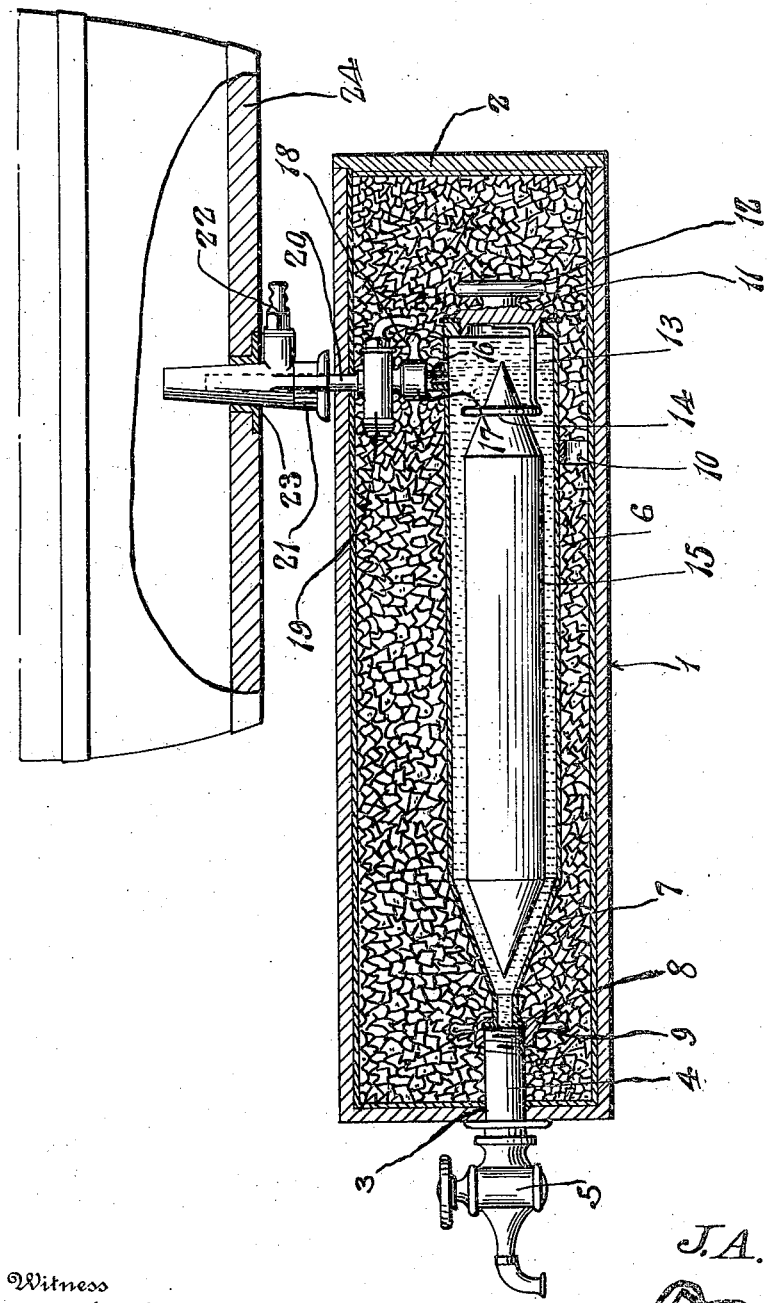
Inventor
J. A. Steinmetz.

UNITED STATES PATENT OFFICE.

JOSEPH A. STEINMETZ, OF BALTIMORE, MARYLAND.

BEER-COOLER.

1,244,140. Specification of Letters Patent. Patented Oct. 23, 1917.

Application filed July 8, 1916. Serial No. 108,149.

*To all whom it may concern:*

Be it known that I, JOSEPH A. STEINMETZ, a citizen of the United States, residing at Baltimore, in Baltimore City and State of Maryland, have invented certain new and useful Improvements in Beer-Coolers; and I do hereby declare the following to be a full, clear, and exact description of the invention, such as will enable others skilled in the art to which it appertains to make and use the same.

This invention relates to new and useful improvements in a beer cooler and one of its objects is the provision of a device of this character, which shall be simple, durable and efficient, and which may be manufactured and sold at a comparatively low cost.

Another object of this invention is to provide an ice container in which is mounted a cooling receptacle, that is connected to a beer keg for receiving beer therefrom, whereby the beer will become cooled within the receptacle by engaging the wall thereof.

A further object of this invention is to provide a float within the cooling receptacle to prevent rapid passage of beer within the receptacle and which will cause the beer through the receptacle to contact with the walls thereof in a small quantity to quickly and efficiently cool same.

A still further object of this invention is to provide means for automatically feeding air to the beer as the beer enters the cooling receptacle and is so arranged that the carbonic gases will not escape from the beer.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which:—

The figure is a horizontal sectional view, of a beer cooler, constructed in accordance with my invention.

Referring in detail to the drawing, the numeral 1 indicates an insulated casing, having a detachable end cover 2 and an opening 3 in the opposite end thereof, in which a pipe 4 is mounted. A suitable valve 5 is secured to the pipe 4 for controlling the outflow of liquid therethrough.

A cylindrical cooling receptacle 6 is positioned within the casing 1 and has a substantially funnel-shaped end 7, to which a coupling 8 is rotatably secured. The coupling 8 is internally screw-threaded to receive the screw-threaded end of the pipe 4. Suitable handles 9 are formed on the coupling 8 to facilitate turning of the coupling 8 upon the funnel-shaped end 7 of the receptacle 6 to thread it to the pipe 4. Suitable legs 10 are secured to the receptacle 6 adjacent its other end for an engagement with the wall of the casing 1, to properly space this end of the receptacle 6 from the casing 1. A detachable cap 11 is threaded or otherwise secured to the receptacle 6 and has formed thereon a suitable handle or knob 12. A float guard 13 is secured to the inner face of the cap 11 and consists of a continuous piece of wire which is bent to form a loop 14 for receiving one end of a float 15. The float 15 and the receptacle 6 are constructed from copper or other suitable material and the float 15 is of cylindrical formation having its ends of substantially conical shape. A pipe 16 is connected to the receptacle 6 and has rotatably mounted thereon a coupling 17 which is provided with handles 18. The coupling 17 is connected to a valve 19 which is in turn connected to a pipe 20 which extends through an opening in the casing 1. The pipe 20 is received by a keg tap 21, which is of any desired construction, employing an air vent 22, which is closed by a check valve (not shown). The keg tap 21 is received within a bung hole 23 of a keg 24 that contains beer.

In operation, the cover 2 is removed and the space occurring between the receptacle 6 and the inner wall of the casing 1 is filled with ice and the keg tap 21 is connected to a keg of beer, which beer flows into the cooling receptacle 6 by way of the pipe 20, valve 19 and the pipe 16. As the beer fills the cooling receptacle 6, the float 15 raises therein as clearly illustrated in the drawing, to prevent the beer from occupying a space centrally of the receptacle, thus only allowing a quantity of beer sufficient to fill the receptacle between the wall thereof and the float, so that the beer will become quickly and efficiently cooled. By opening the valve 5, the beer within the cooling receptacle 6 may be drawn therefrom as desired in a cooled condition and as the beer is drawn from the receptacle 6, the float 15 moves in the direction of the end 7, preventing the beer from rapidly passing out of the pipe 4, thus the beer is fully cooled as it passes through the receptacle. After the valve 5 is closed, the float 15 again returns to its normal position properly positioning the beer within the receptacle so that it will become efficiently cooled. As the beer enters the receptacle 6, air is drawn in through the air vent 22 by the suction of the beer passing through the keg tap 21 and the pipe 20, obviating the necessity of making an air vent within the beer keg thus preventing the escapage of carbonic gases from the beer.

A device constructed in accordance with the foregoing description is capable of being readily disassembled whereby the various parts may be cleaned, which cannot be accomplished with beer coolers now principally used and that employ coils for cooling the beer.

While I have shown and described the preferred embodiment of my invention, it will be understood that minor changes in construction, combination and arrangement of parts may be made without departing from the spirit and scope of the invention as claimed.

Having thus described my invention, what I claim is:—

A beer cooler comprising a casing a substantially cylindrical receptacle mounted within the casing, said receptacle having a substantially funnel-shaped end, a pipe detachably connected to the funnel-shaped end of the receptacle and extending through the casing, a valve carried by said pipe, means for detachably connecting the cooling receptacle with a beer keg for supplying the receptacle with beer, a substantially cylindrical float mounted within the receptacle and having conical-shaped ends, a wire secured to the receptacle at the end opposite the funnel-shaped end and bent to form a loop to slidably receive the end of the float to properly position the float within the receptacle, and means for automatically supplying air to the beer as it enters the cooling receptacle.

In testimony whereof I affix my signature in presence of two witnesses.

JOSEPH A. STEINMETZ.

Witnesses:
WALTER E. SMITH,
ADOLPH C. PARKENT.

Copies of this patent may be obtained for five cents each, by addressing the "Commissioner of Patents, Washington, D. C."